July 28, 1959  E. BRAUN  2,896,254
APPARATUS FOR THE MANUFACTURE OF THIN ARTIFICIAL
EDIBLE SAUSAGE CASINGS
Filed March 24, 1955  2 Sheets-Sheet 1

INVENTOR
EMIL BRAUN
BY
AGENT

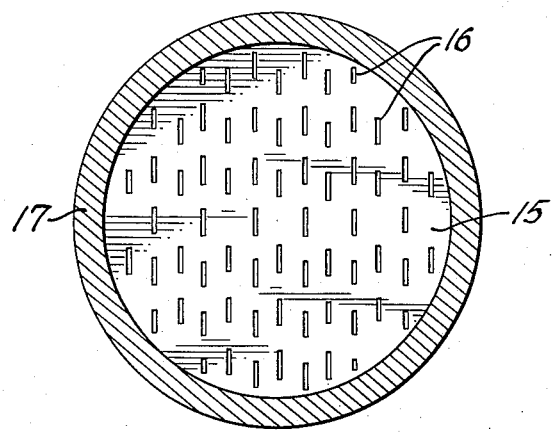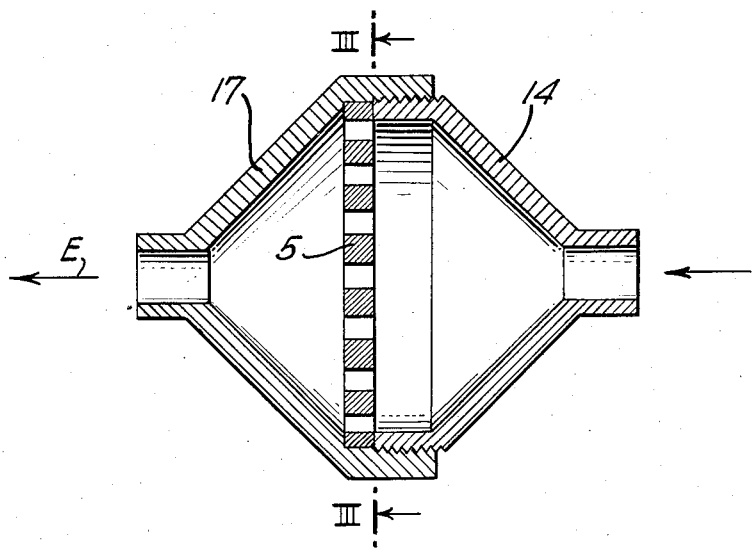

United States Patent Office 2,896,254
Patented July 28, 1959

2,896,254

APPARATUS FOR THE MANUFACTURE OF THIN ARTIFICIAL EDIBLE SAUSAGE CASINGS

Emil Braun, Weinheim an der Bergstrasse, Germany, assignor to Carl Freudenberg, Kommanditgesellschaft auf Aktien, Weinheim, Germany Application March 24, 1955, Serial No. 496,584

Claims priority, application Germany, April 14, 1954

3 Claims. (Cl. 18—14)

The invention relates to an apparatus for the manufacture of thin artificial edible sausage casings for the preparation of small thin sausages like frankfurters, bockwurst, wieners, regensburgers, and the like. It is well known to use sheep gut, which in the inflated state has a diameter of only about 16 to 26 mm., has very thin walls and is usually eaten together with the sausage. The gut has to be as clean as possible, particularly because such sausages are frequently marketed in cans, which may buckle when unclean guts are used. On the other hand, it is difficult to obtain complete sterilization of animal guts, as such guts carry persistent forms of bacteria very resistant to sterilization.

It is a principal object of the invention to provide an apparatus for the preparation of very thin sausage casings from bacteria-free edible animal material.

Other objects and advantages will be apparent from a consideration of the specification and claims.

The invention is illustrated by the accompanying drawings, in which:

Figures 3 and 4 show two views of a strainer in the form of a slotted plate.

For a better understanding of the invention, it will be useful to describe first briefly the manufacture of artificial sausage casings as heretofore practiced. In this known procedure, animal hide or skin is swollen by the addition of suitable swelling agents, and shredded in the swollen state. The thus obtained swollen fibrous mass is formed into tubing by forcing the mass through annular nozzles with simultaneous inflation by air; the formed structure is then dried and hardened. For carrying out said process, devices have been used in which the plastic kneadable mass, while it is passed under high pressure through the annular discharge passage of the nozzle, is subjected to a treatment displacing the arrangement of the fibers and thus increasing the strength of the casings.

Figure 1:
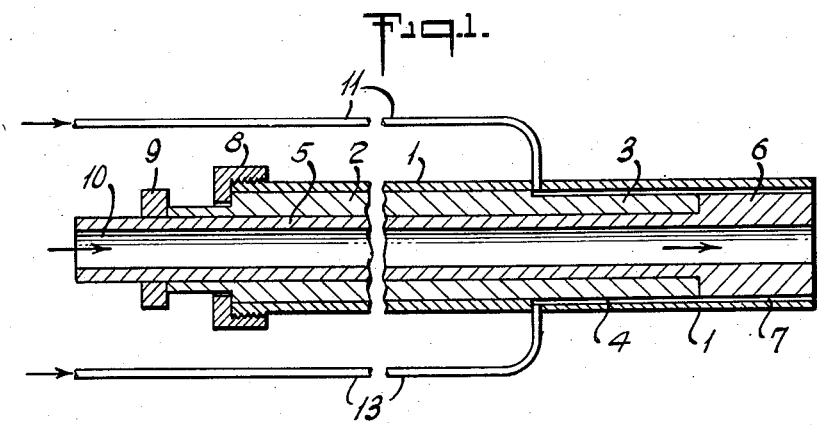
Fig. 1 is a longitudinal sectional view of a conventional apparatus for the manufacture of artificial sausage casings.

Such an apparatus is illustrated in Fig. 1, where a cylindrical tubular outer core 2 is rotatably arranged in a cylindrical sleeve 1. The outer diameter of the front portion 3 of the core 2 is reduced so as to provide an annular space 4 between said front portion 3 and the sleeve 1. A stationary inner tubular core 5 is provided within the rotating core 2 and the front portion 6 of said core 5 projects beyond the front portion 3 of the core 2. The front portion 6 of the core 5 is so dimensioned that between said portion and the sleeve 1 an annular space 7 is formed, which is a continuation of the annular space 4. The inner stationary core 5 has a longitudinal bore 10, through which air under pressure may be injected in direction of the arrows. The fibrous mass is passed into the annular chamber 4, i.e. into the hollow space provided in the rotating part of the outer core, through thin tubes 11 and 13, which preferably lead tangentially into the annular space 4. The fibrous mass is passed into said tubes by means of pressure cylinders. During the passage of the plastic mass through the thin tubes, the fibers are arranged in axial direction. Due to the tangential introduction into the annular nozzle passage 4, the fibers are positioned tangentially with respect to the longitudinal direction of the tubing being formed. The rotating core element 3 causes said tangential position of the fibers to be maintained and produces a certain kneading and rolling of the mass, which prevents the formation of weak spots. A partial alignment of the fibers in approximately axial direction takes place in the fiber layer which travels along the stationary wall of the nozzle. When the fibrous mass enters the stationary forward end 7 of the annular nozzle passage, the fibers of the outer layer continue being disposed in axial direction, while at the same time also fibers of the inner layer, which travels along the stationary portion of the nozzle core, are adjusted in axial direction. A further effect of the stationary nozzle portion is that the tubular structure is discharged without rotary motion and therefore can without any trouble be withdrawn and further processed, for instance passed into a drying chamber. By displacing the fibers particularly in the outer and inner layer of the tubular structure and aligning the same in the desired direction, structures are obtained in which the fibers are disposed in different directions in the different layers, for instance in such a way that the middle layer contains the fibers in natural interlaced or in tangential position, whereas in the outer and inner layers the fibers are disposed in the desired, preferably in axial direction. In this way, intercrossing plies may be obtained.

Devices of the type described have been used for many years to manufacture artificial sausage casings of conventional thickness to full satisfaction. However, it has been impossible to prepare in the same manner thin-walled edible casings of the type here involved. This will be readily understood when it is taken into account that the usual casings prepared according to the procedure set forth hereinabove have, in the dried state, wall strengths of 0.040 to 0.060 mm. Consequently, the forming passages of the nozzles used for the manufacture of said casings have a width of 0.040 to 0.060 mm. The thin casings here involved, however, have a wall thickness of only 0.012 to at most 0.016 mm. For the manufacture of such thin-walled casings annular nozzles are required, the forming passage of which has a width not exceeding 0.14 to 0.22 mm. It is extremely difficult to convert fibrous masses by forced passage through such narrow passages into sausage casings of uniform good properties, which are able to withstand all stresses to which they are subjected.

In order to overcome the recited difficulties, attempts have been made to press the fibrous mass through stationary nozzles, the walls of which are provided with helical grooves. Said procedure proved to be a complete failure. Subsequently, it was tried to adapt devices of the type described hereinabove to the manufacture of thin-walled casings; however, it was found to be impossible to construct in this way serviceable annular nozzles with passages having the required small widths and to operate such nozzles so as to obtain products of unobjectionable quality.

After prolonged investigations, I have found that the cooperation of a plurality of conditions is required for the successful solution of the problem, and that special attention has to be given already to a preparation of the fibrous paste for the manufacture of the thin casings. Good results are obtained when the following conditions are maintained.

Suitable hide or skin pieces are placed in a hydrated lime (Ca(OH)$_2$) solution, and then acidified with hydrochloric acid; after washing out the excess hydrochloric acid, the acidity is adjusted to a pH of 2.8 to 3.4. The acidulated skin pieces are then shredded in the following manner: The coarsely cut skin pieces are first crushed between fluted roller and then forced twice through perforated plates having holes of 1.5 and 1.0 mm. diameter. The thus obtained fibrous mass is entirely suitable for the manufacture of conventional artificial sausage casings according to the precedure set forth hereinabove. However, for the manufacture of casings having a wall thickness only one-third to one-fifth of that of ordinary sausage casings, it is necessary to obtain a much finer comminution of the fibrous mass. Such fine disintegration may be carried out, for instance, by forcing the fibrous mass, as obtained by pressing twice through the holes of perforated plates, subsequently, repeatedly, for instance two or three times, through slotted plates; the slots of said plates have a length of about 6–10 mm. and a width which must not exceed the width of the annular nozzle passage used for forming the casings and is preferably only about 0.10 to 0.12 mm.

It is further of advantage to adjust the dry content of the fibrous mass to about 8 to 9.5 percent. Thinner masses yield casings which do not withstand the stresses to which they are subjected on forming and drying. Fibrous masses having a dry content of more than 9.5 percent, on the other hand, yield casings which have too thick walls, which causes discomfort in eating the sausages made with such casings.

For forming the above described finely disintegrated fibrous mass, which contains a dry content of 8 to 9.5 percent, I use a device which differs widely from the conventional annular nozzle devices operating with displacement of the fibers.

An essential feature of the mode of processing the fibrous mass characterized hereinabove, which has been obtained by pressing through slits of only 0.10 to 0.12 mm. width and is free of any lumps, consists in forcing the mass through an annular nozzle, the passage of which has a width of about 0.18 to 0.22, for instance 0.20 mm. whereby the outer wall and the inner core of the nozzle, which form the annular passage between themselves, are rotated in opposite directions. I prefer to use forming passages of relatively short lengths; for the manufacture of casings having a diameter of about 25 mm., the length of the annular passage should not be greater than 2.5 times the diameter of the annular passage, for instance about 40 to 60 mm. Due to the short length of the annular nozzle, the passage of the fibrous mass requires only relatively slight pressures. It is further of advantage to keep the speed of rotation of the nozzle elements (nozzle core and sleeve) relatively low. At an output of 6 to 8 m. of tubing per minute, the number of revolutions of the nozzle core and sleeve into the one and other direction may be for instance, 80 to 100 per minute.

Figure 2:
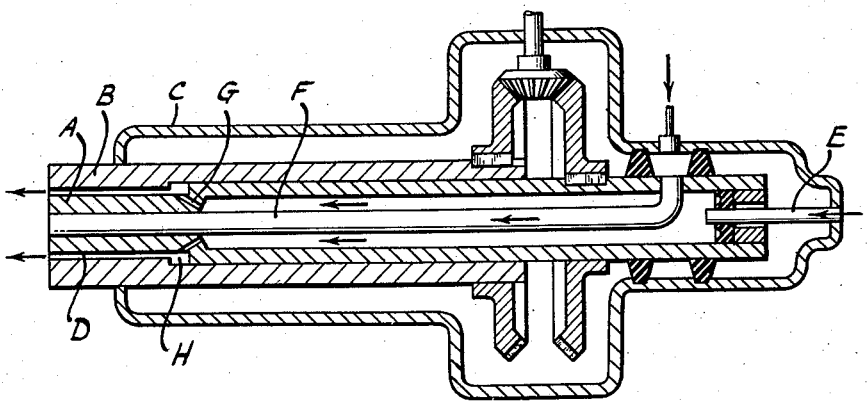
Fig. 2 is a similar view of an apparatus embodying my invention.

The device used for the forming of the thin-walled casings (wall thickness about 0.012 to 0.016 mm.) is shown in Fig. 2 and comprises a tubular core A, which is rotated as a whole during operation of the device. B is the tubular sleeve of the nozzle, which rotates in a direction opposite to that of the core and is supported in a normally stationary housing C. Tube E enters the hollow space of the core A for feeding the fibrous mass. The tube E may be sealed without oil lubrication for instance by means of grooved gaskets of the material known under the trade-name Vulkollan. I prefer to make the diameter of the inlet tube E as small as possible; it may be, for instance, about 8 to 10 mm. The frictional heat and the wear are then so small that the gaskets need be replaced only after more than 1000 hours of operation. A stationary tube F is provided in the inner space of the tubular core A, which tube serves for the introduction of an for inflation of the tubing leaving the annular nozzle.

In the operation of the device, the finely disintegrated fibrous mass is forced through the tube E into the tubular cavity of the core A. At the end of said cavity opposite to the entrance of the tube E, passages G are provided through which the fibrous mass is forced into the annular chamber H. From said chamber, the fibrous mass passes in uniform distribution through the annular forming passage D, where it is subjected to the displacement of the fibers by means of the oppositely rotating core A and sleeve B of the nozzle. The tubular artificial casing leaves the passage D in the direction of the arrow and is inflated by air injected through the tube F in the direction of the arrow. It is withdrawn in the inflated state and further processed, for instance by passing through a drying channel and hardening; suitable lengths of the dried tubing, for instance lengths of about 50 m. may then be wound into coils.

The following example is given to illustrate the invention.

*Example*

100 kg. of commercial glue stock, which consists of skin splits which are as thin as possible, is kept for two weeks in a 5% suspension of caustic lime in water at atmospheric temperature. Then the splits are rinsed and treated for 4 hours with a dilute 5% hydrochloric acid solution. After removal of the acid, the skin pieces are washed with water until they have a pH of 2.9. The pieces are then crushed and shredded between rotating roller pairs, and the obtained mass is forced through perforated plates having holes of 1 mm. diameter; in this way, 160 kg. of a highly swollen fibrous mass are obtained, which has a dry content of 10.0%. Said dry content is reduced to 8 percent by adding 40 l. of water to the mass homogenized in a kneader. Said 8% viscous fibrous dough is forced under a pressure of 120 atm. three times through slits of a perforated plate, which slits are 0.10 mm. wide and 5 mm. long.

The thus prepared fibrous paste, which during preparation was never subjected to a temperature exceeding 25° C., is now forced by means of a continuously acting compression device under a pressure of 80 atm. into the extruder shown in Fig. 2 of the drawings and described hereinabove. The annular forming passage of the nozzle has a diameter of 24 mm. and a width not exceeding 0.22 mm., for instance 0.18 or 0.20 mm. The tubing leaves the nozzle at a rate of 10 m. per minute. In order to keep the tubing inflated, it is maintained under an inner air pressure corresponding to 50 mm. of water, and is passed in the inflated state through a drying chamber where it dried at 50° C. and tanned with wood smoke. The dried and hardened tubing is then wound on reels and is ready for use.

The wall thickness of the dry tubing is only 0.016 mm., and such artificial casings form therefore an excellent substitute for natural casings made of thin sheep guts, without presenting the disadvantages thereof. On eating sausages made with such artificial casings, no difference can be noticed over sausages made with natural casings.

While in the foregoing description I have set forth specific details of procedures and structure, it will be understood that wide variations may be made by those skilled in the art without departing from the spirit of my invention. The apparatus itself may obviously be modified in various parts without changing the underlying idea of the invention disclosed.

I claim:

1. An apparatus for converting finely disintegrated swollen animal skin into artificial edible sausage casings having a wall thickness not substantially exceeding 0.016 mm., comprising a rotatable tubular cylindrical core, a sleeve surrounding said core and rotatable in the opposite direction, said core and sleeve forming between themselves an annular passage having a width not exceeding about 0.22 mm., a tube entering the tubular cavity of said core for feeding a fibrous mass thereinto, passages in the wall of said core connecting the cavity thereof with said annular passage, and means for injecting air into said tubular cavity of said core for inflating tubing formed in said annular passage.

2. An apparatus as defined in claim 1, wherein said tube is connected with straining means having slotted perforations of a width smaller than the width of said annular passage and of a length of about 6 to 10 mm.

3. An apparatus as defined in claim 1, wherein the length of said annular passage is not more than 2.5 times the diameter thereof.

References Cited in the file of this patent

UNITED STATES PATENTS

| | | |
|---|---|---|
| 2,114,220 | Freudenberg et al. | Apr. 12, 1938 |
| 2,291,212 | Clinefelter | July 28, 1949 |
| 2,488,595 | Henning | Nov. 22, 1949 |
| 2,676,356 | Becker | Apr. 27, 1954 |
| 2,714,744 | Becker | Aug. 9, 1955 |

FOREIGN PATENTS

| | | |
|---|---|---|
| 471,566 | Great Britain | Sept. 7, 1937 |
| 892,855 | Germany | Oct. 12, 1953 |

OTHER REFERENCES

A. P. C. Application of Becker et al., Serial No. 206,948, published April 27, 1943.